US012035864B1

(12) United States Patent
Haley

(10) Patent No.: US 12,035,864 B1
(45) Date of Patent: Jul. 16, 2024

(54) SWEEPER BIN

(71) Applicant: Edward Thomas Haley, Martinsville, IN (US)

(72) Inventor: Edward Thomas Haley, Martinsville, IN (US)

( * ) Notice: Subject to any disclaimer, the term of this patent is extended or adjusted under 35 U.S.C. 154(b) by 0 days.

(21) Appl. No.: 18/348,595

(22) Filed: Jul. 7, 2023

(51) Int. Cl.
*A47L 13/52* (2006.01)
*A47L 13/41* (2006.01)
*B03C 1/30* (2006.01)

(52) U.S. Cl.
CPC ............... *A47L 13/52* (2013.01); *A47L 13/41* (2013.01); *B03C 1/30* (2013.01)

(58) Field of Classification Search
CPC . B03C 1/30; A47L 13/41; A47L 13/51; A47L 13/52
See application file for complete search history.

(56) References Cited

U.S. PATENT DOCUMENTS 2,654,480 A * 10/1953 Stem ......................... B03C 1/30 209/229
2,693,279 A 11/1954 Box
2,709,002 A 5/1955 Hoff
2,962,740 A * 12/1960 Plantholt ............. A47L 11/4061 15/45
3,101,498 A * 8/1963 Davlantes ........... A47L 11/4075 56/203
6,402,212 B1 * 6/2002 Hsiao ........................ E01H 1/14 209/215
6,592,161 B1 * 7/2003 Hsiao ....................... B25H 3/02 209/215
7,806,272 B2 10/2010 Al-Hasan
8,104,620 B2 * 1/2012 Lin ........................... B03C 1/08 15/1

FOREIGN PATENT DOCUMENTS

CN 213105793 U 5/2021
CN 215650927 U 1/2022

OTHER PUBLICATIONS

Machine translation of CN213105793 U by PatDocs PDF on Mar. 3, 2023 (p. 11).
Machine translation of CN215650927U by PatDocs PDF on Mar. 3, 2023 (p. 15).

* cited by examiner

*Primary Examiner* — Michael McCullough
*Assistant Examiner* — Kalyanavenkateshware Kumar
(74) *Attorney, Agent, or Firm* — Woodard, Emhardt, Henry, Reeves & Wagner, LLP

(57) ABSTRACT

A receptacle system for a sweeper that includes a bin with a base and sidewalls that together define a receptacle space that receives items released from the sweeper, an insert attached to the bin where an upper portion of the insert slopes upward from a front side towards a rear side of the receptacle system when the insert is attached to the bin with tracks defined in the upper portion for the wheels of the sweeper to roll along the slope to position the sweeper above the bin, and where the insert covers a portion of the receptacle space, where the insert defines an opening such that items released by the sweeper pass through the opening when the wheels of the sweeper are positioned on the tracks of the insert.

19 Claims, 9 Drawing Sheets

SWEEPER BIN

BACKGROUND

The present disclosure relates to a sweeper bin.

Sweepers can be used to clear items from the ground and deposit the items in a bin. In particular, some sweepers can selectively pick up ferrous materials, such as through a magnet. Such items can contribute to unsafe conditions in various environments, such as in construction sites, on lawns, and/or in warehouses. For example, it can be unsafe in such environments to leave various uncontained ferrous items on the ground, including loose nails, screws, metal shavings, and/or other debris.

There is a need for a sweeper bin. This can be accomplished through a combination of several design features described below.

DESCRIPTION OF THE SELECTED EMBODIMENTS

Figure 1:
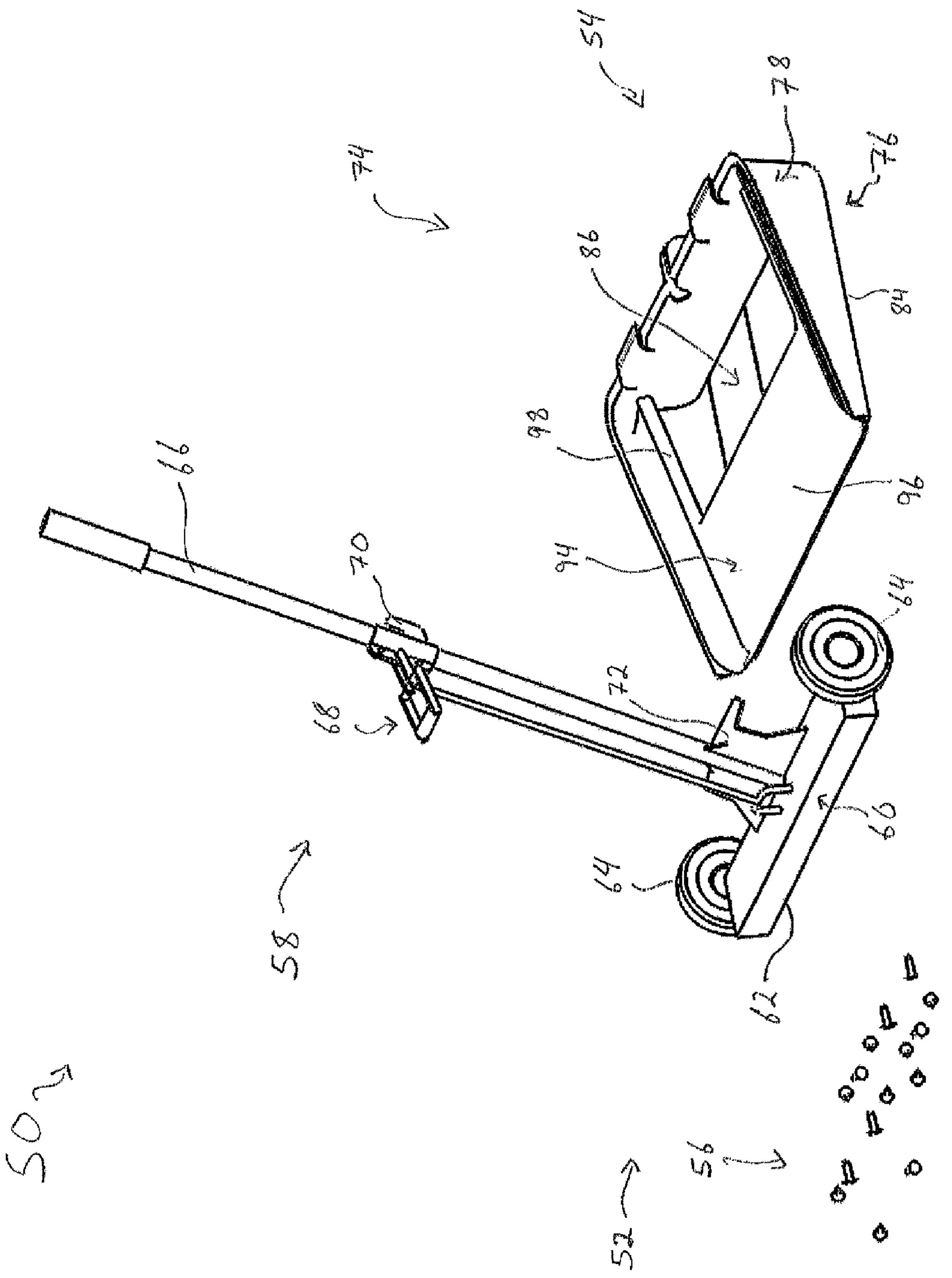
FIG. 1 is a perspective view of a sweeping system including a sweeper and a receptacle system.

For the purpose of promoting an understanding of the principles of the claimed invention, reference will now be made to the embodiments illustrated in the drawings and specific language will be used to describe the same. It will nevertheless be understood that no limitation of the scope of the claimed invention is thereby intended. Any alterations and further modifications in the described embodiments, and any further applications of the principles of the claimed invention as described herein are contemplated as would normally occur to one skilled in the art to which the claimed invention relates. One embodiment of the claimed invention is shown in great detail, although it will be apparent to those skilled in the relevant art that some features that are not relevant to the present claimed invention may not be shown for the sake of clarity.

With respect to the specification and claims, it should be noted that the singular forms “a”, “an”, “the”, and the like include plural referents unless expressly discussed otherwise. As an illustration, references to “a device” or “the device” include one or more of such devices and equivalents thereof. It also should be noted that directional terms, such as “left”, “right”, “up”, “down”, “top”, “bottom”, and the like, are used herein solely for the convenience of the reader in order to aid in the reader’s understanding of the illustrated embodiments, and it is not the intent that the use of these directional terms in any manner limit the described, illustrated, and/or claimed features to a specific direction and/or orientation.

FIG. 1 depicts a sweeping system 50 that generally includes a sweeper 58 and a receptacle system 74. Sweeper 58 is used to move items 56 from the ground into receptacle system 74. In the illustrated embodiment, sweeper 58 is configured to pick items 56 from the ground and then release items 56 into receptacle system 74. Sweeping system 50 is generally oriented such that sweeper 58 moves items 56 from a front side 52 to receptacle system 74 positioned on a rear side 54.

Sweeper 58 generally includes a magnet 60, a separator plate 62, wheels 64, a shaft 66, a lever 68, a hanger 70, and a ledge 72. Magnet 60 is configured to attract items 56 from the ground and magnetically couple to items 56. Magnet 60 can include one or more permanent magnets, electromagnets, and/or another type of magnet. Plate 62 is positioned on a bottom portion of magnet 60 such that items 56 contact plate 62 when magnetically coupled to magnet 60. Plate 62 is rotatably coupled to magnet 60. Lever 68 is operable to selectively rotate magnet 60 in relation to plate 62. In the illustrated embodiment, lever 68 is mechanically coupled to magnet 60 such that rotating lever 68 causes magnet 60 to rotate. By rotating magnet 60 away from plate 62, items 56 that are coupled magnet 60 are separated from the attractive magnetic force and released from sweeper 58. It can be appreciated that sweeper 58 could use another mechanism to selectively pick up and release items 56. In one example, lever 68 can be an electronic switch that controls a vacuum, an electromagnet, and/or another device on sweeper 58 that attracts items 56.

Wheels 64 are rotatably coupled to sweeper 58 and are positioned on lateral sides of sweeper 58. In the illustrated embodiment, sweeper 58 includes one wheel 64 on each lateral side. Wheels 64 support movement of sweeper 58 such that magnet 60 is held at a consistent height from the ground. Using only one wheel 64 on each side, sweeper 58 is able to move in straight lines and turn while wheels 64 remain in contact with the ground.

Shaft 66 is positioned on an upper portion of sweeper 58 and extends upwards. Shaft 66 is generally cylindrical in shape. Shaft 66 allows a user to grasp sweeper 58 in order to push and move sweeper 58.

Hanger 70 is positioned on shaft 66 and is configured to support a portion of receptacle system 74 in a transport configuration. Similarly, ledge 72 is positioned on shaft 66 and is configured to support a portion of receptacle system 74 in that configuration. Ledge 72 is further configured to limit or prevent motion of receptacle system 74 in a rearward direction while in the transport configuration.

As illustrated, receptacle system 74 is generally configured to rest on the ground horizontally in a receiving configuration. Receptacle system 74 is configured to receive and contain items 56 that are released from sweeper 58. Receptacle system 74 can be positioned in the receiving configuration while sweeper 58 is picking up items 56 and while sweeper 58 releases items 56 into receptacle system 74. Receptacle system 74 generally includes a bin 76 and an insert 94. Bin 76 forms a bottom portion of receptacle system 74. When insert 94 is coupled to bin 76, insert 94 is positioned at least partially within bin 76 and on an upper portion of receptacle system 74.

Bin 76 generally includes sidewalls 78 and a base 84. Base 84 forms the bottom portion of bin 76. Base 84 rests against the ground when receptacle system 74 is in the receiving configuration. Sidewalls 78 extend upward from base 84. In the illustrated configuration, bin 76 is integrally formed as a single piece. As illustrated, base 84 transitions into sidewalls 78 through a smooth continuous portion. In an alternative embodiment, base 84 and sidewalls 78 can be distinct pieces and/or transition at a sharp angle. Sidewalls 78 do not extend across bin 76 on front side 52.

Bin 76 further defines a receptacle space 86 within sidewalls 78 and above base 84. Bin 76 is made from a rigid material in order to maintain the structure of bin 76 and keep receptacle space 86 open. For example, bin 76 can be made from plastic or metal. When bin 76 receives items 56, items 56 settle in receptacle space 86. Sidewalls 78 impede items 56 from exiting receptacle space 86. Base 84 provides a surface for items 56 to rest on when bin 76 is in a receiving configuration.

Insert 94 is removably coupled to bin 76. As illustrated, when insert 94 is coupled to bin 76, insert 94 is positioned above a portion of receptacle space 86. Insert 94 includes a panel 96 on an upper portion. Panel 96 is generally flat and slopes upward from front side 52 to rear side 54. Panel 96 defines a track 98 positioned on each lateral side. Tracks 98 provide a structure for wheels 64 to roll onto insert 94. In the illustrated embodiment, tracks 98 are positioned between lateral sidewalls 80 of bin 76. In an alternate embodiment, a portion of insert 94 and tracks 98 can be positioned laterally outwards of bin 76.

Figure 2:
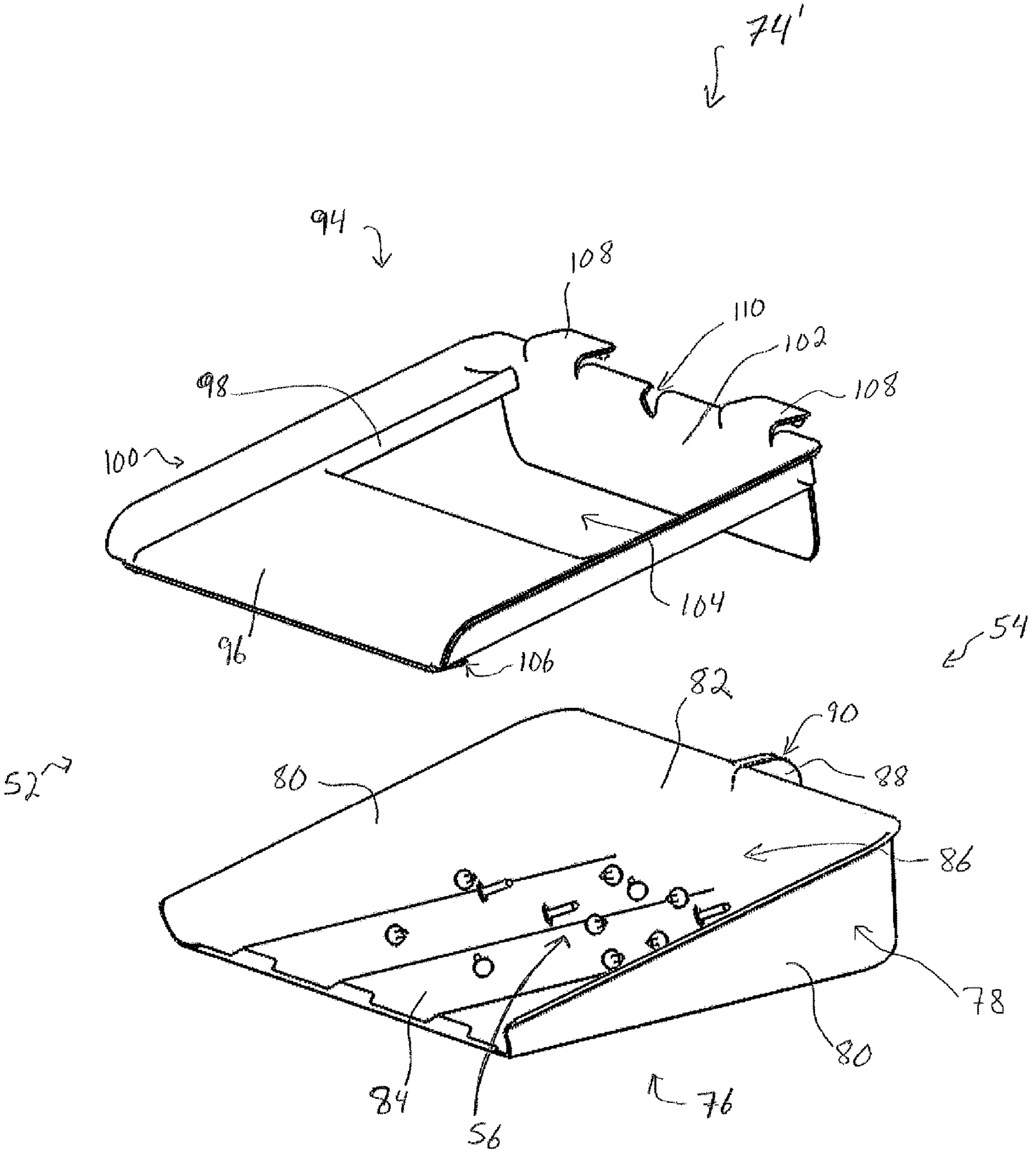
FIG. 2 is a perspective view of the FIG. 1 receptacle system in a disassembled state.
Figure 3:
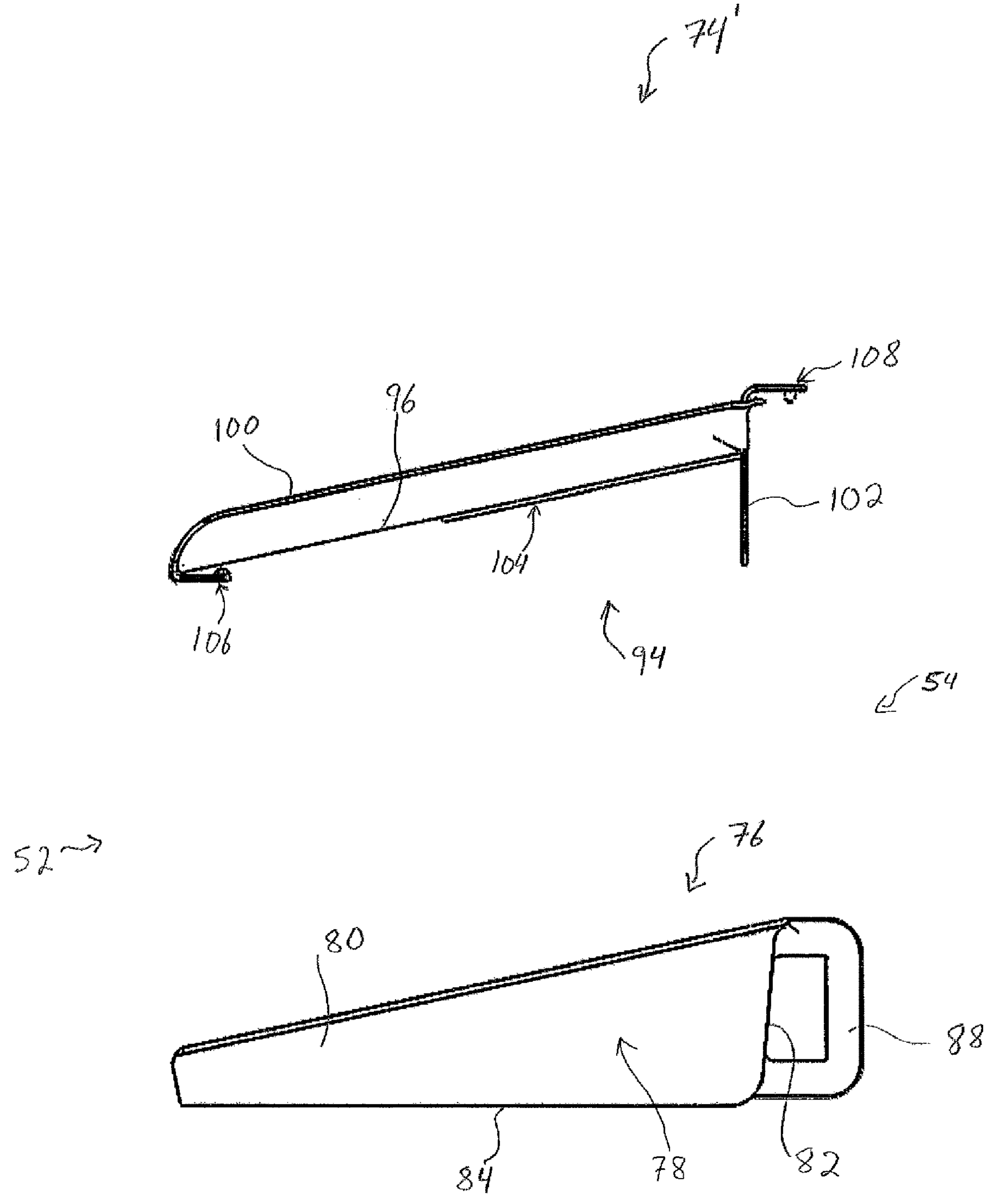
FIG. 3 is a side elevation view of the FIG. 2 receptacle system.
Figure 4:
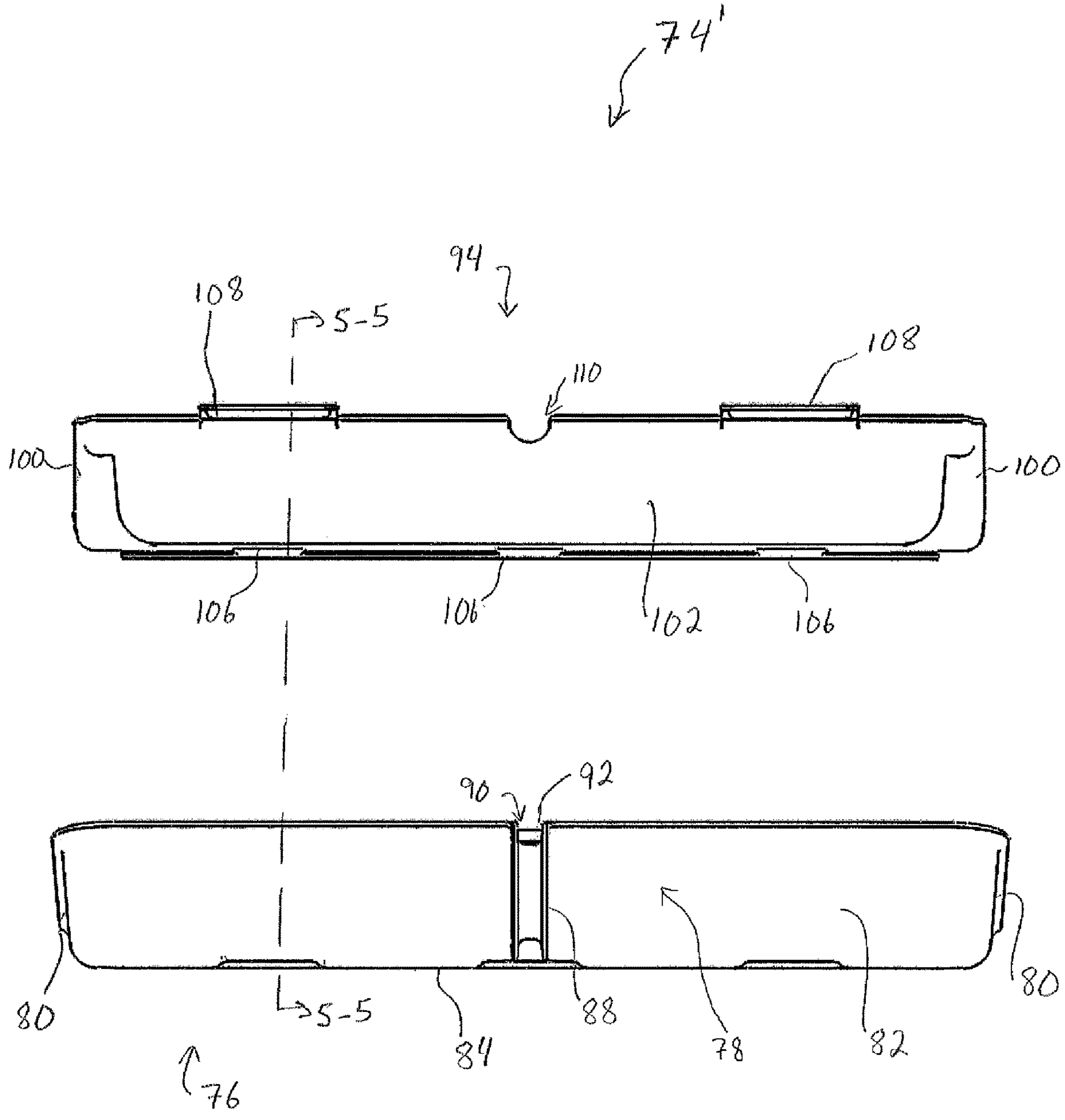
FIG. 4 is a rear elevation view of the FIG. 2 receptacle system.

Referring to FIG. 2, FIG. 3, and FIG. 4, insert 94 further includes a lip 100, a support 102, front clips 106, and rear clips 108. Lip 100 extends distally on insert 94. When insert 94 is coupled to bin 76, lip 100 is positioned along a portion of sidewalls 78. Lip 100 is generally contoured in a similar way to the shape of an upper portion of sidewalls 78. In one embodiment, lip 100 contacts an upper portion of sidewalls 78 and supports insert 94 in a vertical direction. Insert 94 does not include lip 100 on front side 52 such that wheels 64 are not obstructed to roll onto insert 94 from front side 52.

Support 102 is positioned on rear side 54 of insert 94. Support 102 provides structural support to insert 94 on rear side 54. Panel 96 rests on bin 76 and/or the ground on front side 52 and support 102 rests on bin 76 on rear side 54 to support the position of insert 94 within bin 76.

Insert 94 defines an item opening 104. As illustrated, item opening 104 is enclosed by panel 96 and support 102. When sweeper 58 deposits items 56 into receptacle space 86, items 56 pass through item opening 104. Item opening 104 is generally as wide in a lateral direction as magnet 60 such that all or most items 56 released from magnet 60 drop directly into receptacle space 86 through item opening 104.

Front clips 106 and rear clips 108 are configured to releasably couple insert 94 to bin 76. Generally, front clips 106 and rear clips 108 secure the position of insert 94 relative to base 84 of bin 76. Insert 94 includes one or more front clips 106 on front side 52. Front clips 106 extend partially underneath base 84 when insert 94 and bin 76 are coupled. Front clips 106 secure the position of insert 94 on front side 52. Similarly, insert 94 includes one or more rear clips 108 on rear side 54. Rear clips 108 extend from support 102 and separate lip 100 into multiple segments. Rear clips 108 extend partially over a rearward portion of bin 76 and secure the position of insert 94 on rear side 54. Bin 76 may optionally include one or more protrusions to assist front clips 106 and/or rear clips 108 in coupling insert 94 to bin 76.

As illustrated, sidewalls 78 generally include one or more lateral sidewalls 80 and a rear sidewall 82. A lateral sidewall 80 is positioned on each lateral side of bin 76. Rear sidewall 82 is positioned on bin 76 toward rear side 54. In the illustrated embodiment, the sidewalls 78 are integrally formed as a single piece along an outer portion of bin 76. As illustrated, lateral sidewalls 80 and rear sidewall 82 transition into each other through a smooth continuous portion. In alternative embodiment, lateral sidewalls 80 and rear sidewall 82 can be distinct pieces and/or transition at a sharp angle. Further, the height of lateral sidewalls 80 slopes upward from front side 52 to rear side 54. In this way, the lateral side profile of bin 76 can be generally triangular or trapezoidal.

Bin 76 further includes a bin handle 88 on rear side 54. Bin handle 88 allows a user to pick up and/or move bin 76. Bin handle 88 defines a handle recess 90. Handle recess 90 is configured to accommodate shaft 66 of sweeper 58. When receptacle system 74 is oriented in a transport configuration and coupled to sweeper 58, shaft 66 is positioned within handle recess 90. Similarly, insert 94 defines an insert recess 110 on an upper portion of lip 100 and support 102. Insert recess 110 is similarly configured to accommodate shaft 66 of sweeper 58.

In order to couple to sweeper 58, bin handle 88 further defines a hanger opening 92. Hanger opening 92 is configured to accommodate hanger 70 of sweeper 58. When receptacle system 74 couples to sweeper 58, hanger 70 is positioned within hanger opening 92 such that hanger 70 supports at least a portion of receptacle system 74. Additionally, ledge 72 may support a portion of receptacle system 74 when coupled to sweeper 58.

Figure 5:
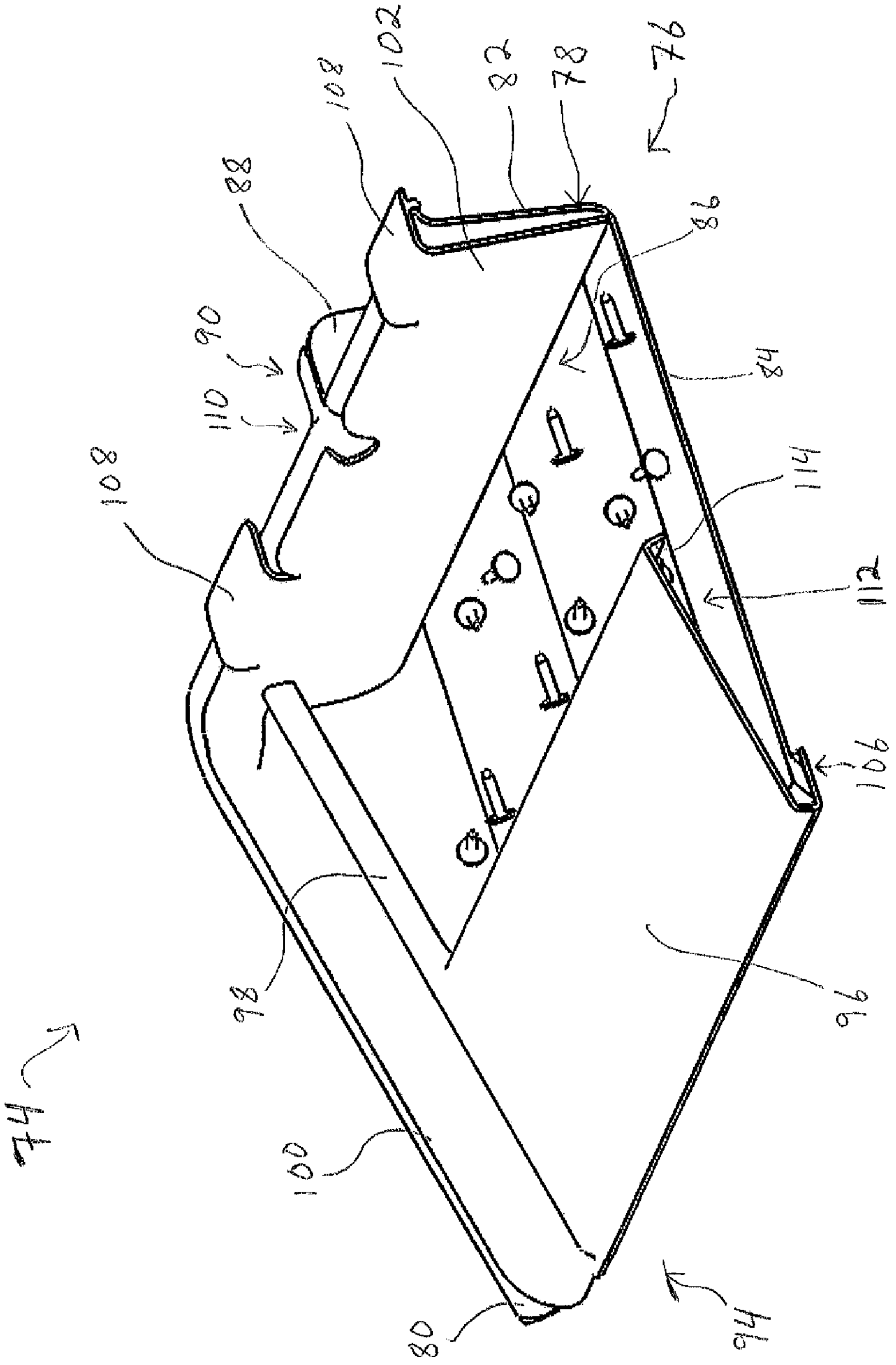
FIG. 5 is a perspective cross-sectional view of the FIG. 2 receptacle system in an assembled state taken along line 5-5 in FIG. 4.
Figure 6:
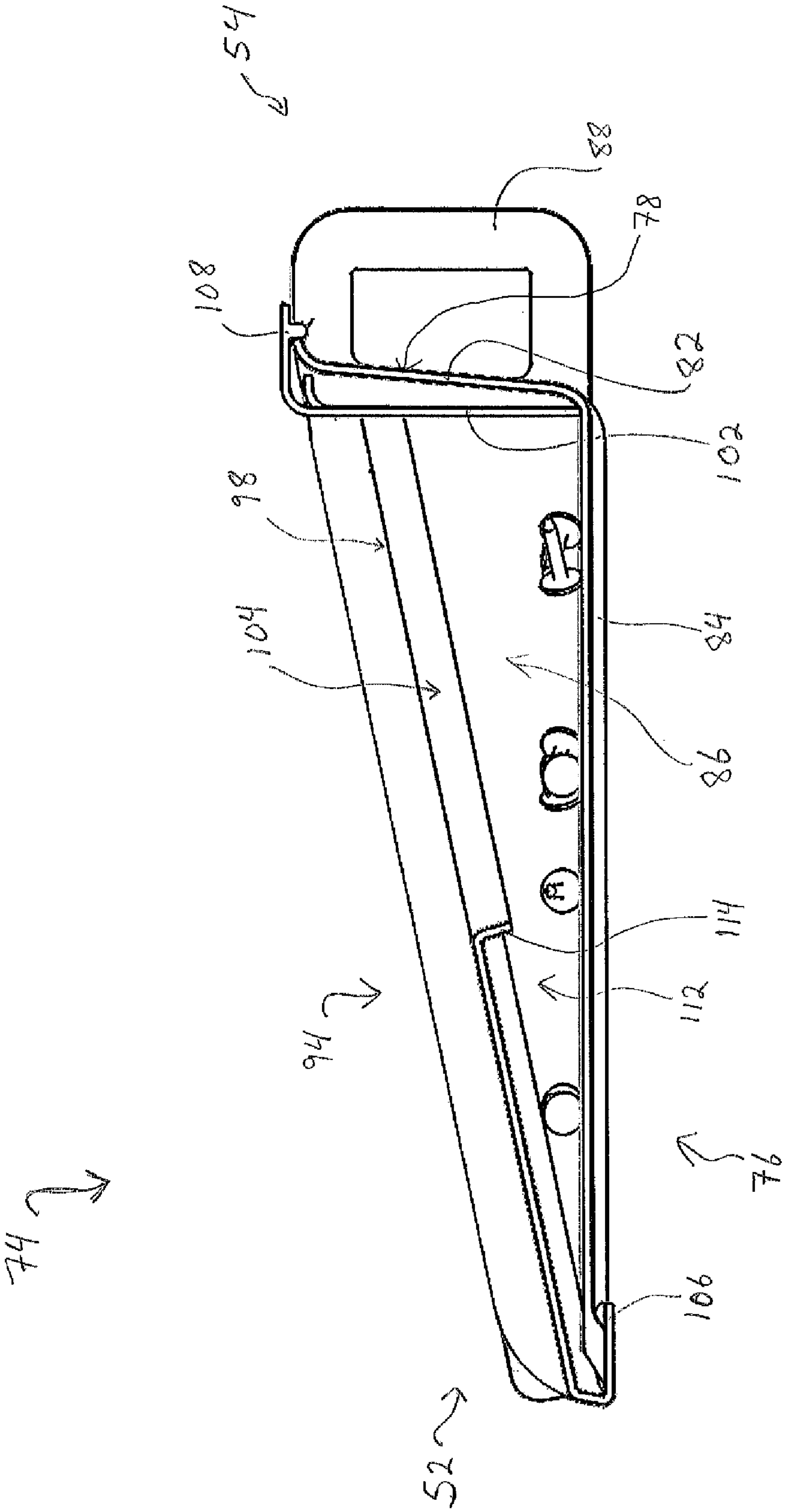
FIG. 6 is a side elevation cross-sectional view of the FIG. 5 receptacle system.

Referring to FIG. 5 and FIG. 6, bin 76 and insert 94 define an enclosed space 112 within receptacle space 86 when coupled. Panel 96 of insert 94 covers a portion of receptacle space 86 to define enclosed space 112. In this way, panel 96 prevents items 56 from exiting enclosed space 112 towards front side 52. Insert 94 further includes flange 114 that extends from panel 96 into receptacle space 86. After items 56 have entered enclosed space 112, flange 114 obstructs items 56 from exiting enclosed space 112 towards rear side 54.

By partially enclosing a portion of receptacle space 86, insert 94 allows a user to change the orientation of receptacle system 74 and still retain items 56 within enclosed space 112. For example, when receptacle system 74 is in a receiving configuration such that base 84 is generally oriented horizontally, base 84 supports items 56 in a vertical direction, and sidewalls 78 and panel 96 surround items 56 along the sides. In another example, when receptacle system 74 is in a transport configuration such that base 84 is generally oriented vertically, base 84 and panel 96 support items 56 in vertical and sideways directions, and sidewalls 78 surround items 56 on lateral sides. Flange 114 further obstructs items 56 from exiting enclosed space 112 when a user tilts, shakes, and/or moves receptacle system 74 in another way. In this way, receptacle system 74 retains most or even all items 56 in enclosed space 112 when the orientation or position of receptacle system 74 changes.

Figure 7:
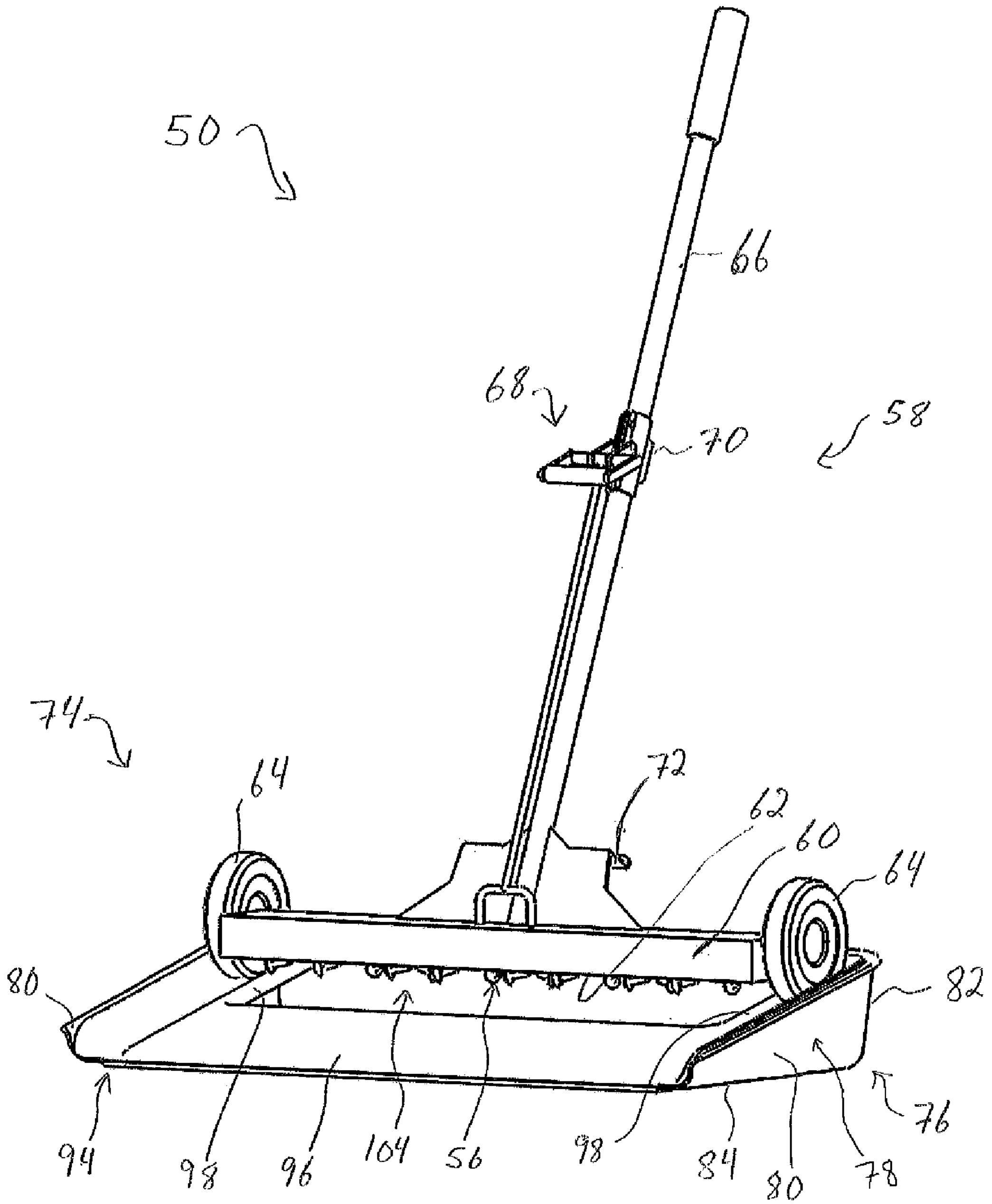
FIG. 7 is a perspective view of the FIG. 1 sweeping system wherein the sweeper is positioned on the receptacle system.

Referring to FIG. 7, wheels 64 of sweeper 58 are configured to roll onto insert 94 along tracks 98 when sweeper system 50 is arranged in a receiving configuration. Magnet 60 and items 56 can be positioned above item opening 104 on receptacle system 74 when sweeper 58 is rolled along tracks 98. As illustrated, lever 68 is in a disengaged position such that separator plate 62 is positioned against magnet 60 and such that items 56 are magnetically coupled to magnet 60.

Figure 8:
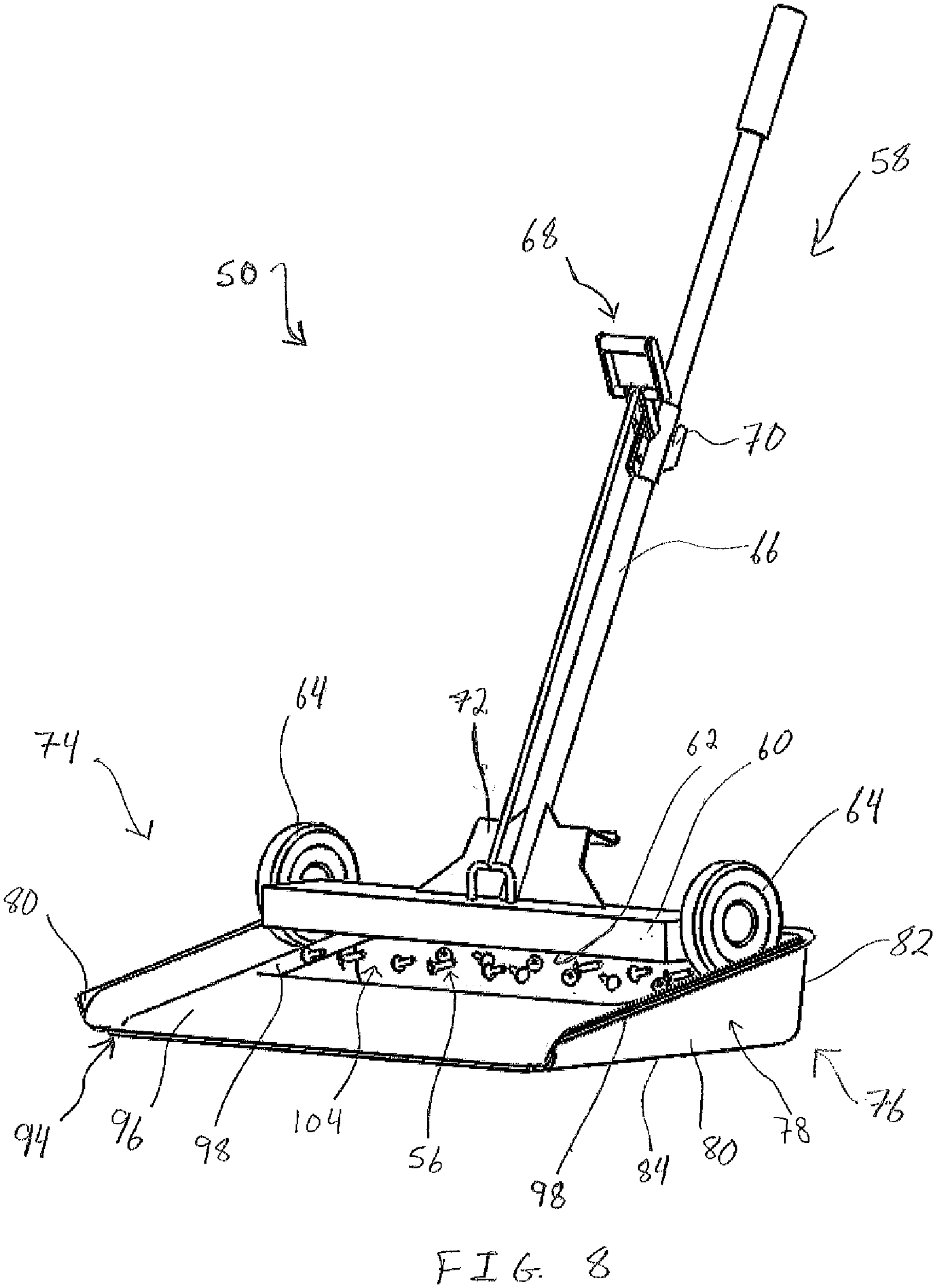
FIG. 8 is a perspective view of the FIG. 7 sweeping system wherein the sweeper is releasing items into the receptacle system.

Referring to FIG. 8, sweeper 58 can release items 56 into receptacle system 74 when positioned above item opening 104. As illustrated, lever 68 is in an engaged position such that magnet 60 rotates away from separator plate 62 and such that items 56 decouple from magnet 60. In this way, a user can pick up items 56 with sweeper 58, move sweeper 58 to receptacle system 74, and then release items 56 from sweeper 58 by operating lever 68.

Figure 9:
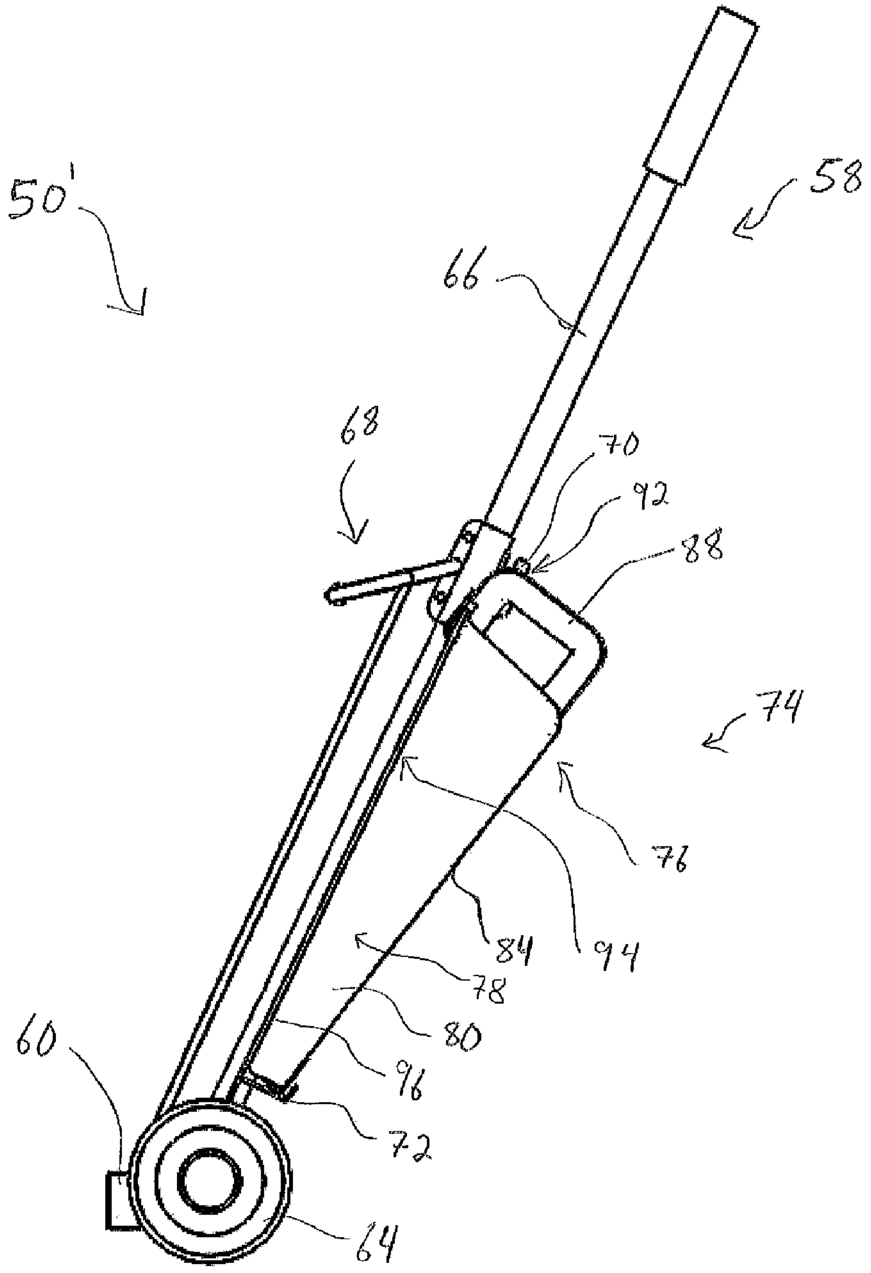
FIG. 9 is a perspective view of the FIG. 1 sweeping system in a transport configuration.

Referring to FIG. 9, sweeper system 50' can be arranged in a transport configuration. In the illustrated embodiment, receptacle system 74 couples to sweeper 58 through hanger 70 on sweeper 58 and hanger opening 92 on receptacle system 74. As noted previously, shaft 66 of sweeper 58 is positioned within handle recess 90 and insert recess 110 of receptacle system 74 in the transport configuration. Further, ledge 72 is positioned under and behind a portion of receptacle system 74 in order to support receptacle system 74 in a vertical direction and to limit movement of receptacle system 74 in a rearward direction. In the transport configuration, receptacle system 74 retains items 56 while a user can push sweeping system 50' towards a location to empty items 56 from receptacle system 74. Additionally, sweeping system 50' can be stored in this configuration.

While the present disclosure has been illustrated and described in detail in the drawings and foregoing description, the same is to be considered as illustrative and not restrictive in character, it being understood that a preferred embodiment has been shown and described and that all changes, equivalents, and modifications that come within the spirit of the claimed invention defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The language used in the claims and the written description and in the above definitions is to only have its plain and ordinary meaning, except for terms explicitly defined above. Such plain and ordinary meaning is defined here as inclusive of all consistent dictionary definitions from the most recently published (on the filing date of this document) general purpose Merriam-Webster dictionary.

The invention claimed is:

1. A sweeping system comprising:

a sweeper including a shaft, a body portion, a first wheel on one lateral side and a second wheel on a second, opposite, lateral side; wherein said body portion of said sweeper is configured to selectively attract items from a floor surface;

a bin including a base and sidewalls, wherein said base and sidewalls define a receptacle space, and wherein said receptacle space is configured to receive items released from said sweeper; and an insert releasably coupled to said bin, wherein an upper portion of said insert slopes upward from a front side towards a rear side of said bin when said insert is attached to said bin, and wherein said insert defines an opening configured to allow items to pass through the insert into said receptacle space;

wherein said bin is in a first orientation when said base of said bin is horizontally oriented, and wherein said bin is in a second orientation when said base of said bin is vertically oriented;

wherein said bin is configured to sit on the floor surface in said first orientation, and wherein said bin is configured to couple to said shaft of said sweeper in said second orientation; and wherein said insert encloses a portion of said receptacle space such that the bin is configured to retain items in both said first orientation and said second orientation.

2. The sweeping system of claim 1, wherein said upper portion defines tracks for the first and second wheels of the sweeper to roll along said slope to position the sweeper above the bin, and wherein said insert covers a portion of the receptacle space.

3. The sweeping system of claim 2, wherein said insert comprises a support on the rear side that elevates said upper portion of said insert above said base of said bin.

4. The sweeping system of claim 2, wherein said insert comprises a lip that extends distally over a portion of said sidewalls of said bin.

5. The sweeping system of claim 2, wherein said tracks of said insert are positioned between said side walls of said bin.

6. The sweeping system of claim 2, wherein a width of said bin is greater than a width of said sweeper.

7. The sweeping system of claim 2, wherein said insert is releasably coupled to said bin.

8. The sweeping system of claim 2, wherein said insert further comprises a plurality of clips that releasably secure said insert to said bin.

9. The sweeping system of claim 2, wherein said bin comprises a handle on a rear side.

10. The sweeping system of claim 9, wherein said handle of said bin defines a channel on an upper end, and wherein said bin is configured to couple to a shaft of the sweeper such that the shaft is positioned within said channel.

11. The Previously presented sweeping system of claim 1, wherein said bin defines an opening configured to receive a hook on the sweeper configured to hang the sweeper in the second orientation on the sweeper.

12. The sweeping system of claim 1, wherein said sweeper further comprises a lever, and wherein changing the position of said lever causes said body portion of said sweeper to selectively attract or release items.

13. The sweeping system of claim 12, wherein said sweeper further comprises a separator plate on a bottom side of said body portion such that coupled items contact said separator plate, and wherein moving said lever causes said body portion to move relative to a magnetic portion of said body portion such that the sweeper releases said coupled items.

14. The sweeping system of claim 1, wherein said shaft on said sweeper comprises a hanger, wherein said bin defines a hanger opening, and wherein said bin is configured to couple to said shaft by positioning said hanger within said hanger opening.

15. The sweeping system of claim 1, wherein said body portion of said sweeper comprises one or more magnets, and wherein said body portion is configured to magnetically couple to items.

16. The sweeping system of claim 1, wherein said upper portion of said insert defines one or more tracks for said first and second wheels of said sweeper, and wherein said first and second wheels are configured to roll onto said tracks when said bin is in said first orientation to position said sweeper above the opening in said insert.

17. The sweeping system of claim 16, wherein said tracks of said insert are positioned between said side walls of said bin.

18. The sweeping system of claim 1, wherein said insert further comprises a plurality of clips that releasably secure said insert to said bin.

19. The sweeping system of claim 1, wherein said insert further comprises a support on the rear side that elevates said upper portion of said insert above said base of said bin.

* * * * *